(12) United States Patent
Pettey

(10) Patent No.: US 9,611,626 B2
(45) Date of Patent: Apr. 4, 2017

(54) MULTI-COMPARTMENT GABION STORMWATER TREATMENT SYSTEM

(71) Applicant: Jeffrey D Pettey, Seattle, WA (US)

(72) Inventor: Jeffrey D Pettey, Seattle, WA (US)

( * ) Notice: Subject to any disclaimer, the term of this patent is extended or adjusted under 35 U.S.C. 154(b) by 34 days.

(21) Appl. No.: 14/566,701

(22) Filed: Dec. 10, 2014

(65) Prior Publication Data

US 2016/0168837 A1    Jun. 16, 2016

(51) Int. Cl.
*E03F 1/00* (2006.01)
*E03B 3/03* (2006.01)
*E02D 29/02* (2006.01)

(52) U.S. Cl.
CPC ............ *E03B 3/03* (2013.01); *E02D 29/0208* (2013.01); *E03F 1/00* (2013.01)

(58) Field of Classification Search
CPC ... E03F 1/00; E03F 5/00; E03F 5/0404; E03F 5/14; E02D 29/02; E02D 29/0208
USPC ...... 210/162, 170.03, 747.3; 405/15, 30, 36, 405/107
See application file for complete search history.

(56) References Cited

U.S. PATENT DOCUMENTS

| | | | | |
|---|---|---|---|---|
| 4,483,640 A * | 11/1984 | Berger | ................ | E02D 29/0208 210/170.03 |
| 5,403,474 A * | 4/1995 | Emery | .................. | E03F 5/0404 210/163 |
| 5,480,254 A * | 1/1996 | Autry | .................... | E03F 5/0404 210/747.3 |
| 5,636,938 A * | 6/1997 | Ragazzo | ............. | E02D 29/0208 405/15 |
| 5,820,762 A * | 10/1998 | Bamer | ...................... | E03F 5/16 210/163 |
| 6,217,757 B1 * | 4/2001 | Fleischmann | ......... | E03F 5/0404 210/163 |
| 6,368,017 B2 * | 4/2002 | Black | .................. | E02D 29/0208 210/170.03 |
| 7,128,498 B2 * | 10/2006 | Sheahan | ................... | B32B 5/26 405/128.75 |
| 7,670,082 B2 * | 3/2010 | Olsta | ................... | E02D 29/0208 405/15 |
| 2010/0186642 A1 * | 7/2010 | Christman | .......... | E02D 29/0208 109/79 |
| 2012/0137598 A1 * | 6/2012 | Chamoux | ........... | E02D 29/0208 52/173.1 |

* cited by examiner

*Primary Examiner* — Christopher Upton
(74) *Attorney, Agent, or Firm* — Thomas E. Loop

(57) ABSTRACT

A novel multi-compartment gabion assembly configured for treating stormwater is disclosed herein. In one embodiment, the novel multi-compartment gabion assembly comprises a plurality of adjacently positioned and integrally connected gabion cells that includes at least one regular gabion cell and at least one corner gabion cell. In other embodiments, the novel multi-compartment gabion assembly comprises a wire mesh gabion that has a filter bag conformally positioned within the gabion, wherein the filter bag is made from at least two different water permeable sheet materials.

8 Claims, 2 Drawing Sheets

MULTI-COMPARTMENT GABION STORMWATER TREATMENT SYSTEM

CROSS-REFERENCE TO RELATED APPLICATION

This application the benefit of priority to U.S. Provisional Application No. 61/914,300 filed on Dec. 10, 2013, which application is incorporated herein by reference in its entirety for all purposes.

TECHNICAL FIELD

The present invention relates generally to stormwater treatment systems, and more particularly, to multi-compartment gabion assemblies and systems configured for treating stormwater run-off and/or discharges.

BACKGROUND OF THE INVENTION

Municipal, commercial and industrial operations are being pushed into improving the quality of their stormwater discharges. A major problem associated with current state-of-the-art treatment processes is that they do not consistently produce a stormwater discharge that meets compliance standards and/or they are expensive to purchase/install and difficult to maintain.

Many state and federal environmental authorities are encouraging stormwater discharge permit holders to consider using organic filter media as a method of achieving stormwater compliance. This is tough to do due to the lack of a proper, general purpose filter housing that can be easily adjusted to various site constraints and/or requirements. Nonetheless, there are several known gabion assemblies (including those disclosed in, for example, U.S. Pat. Nos. 4,483,640; 5,636,938; 5,820,762; 6,368,017; 7,128,498; and 7,670,082) that have been used from time to time to treat stormwater discharges. These prior art assemblies are generally not always effective at achieving stringent stormwater discharge standards.

Accordingly, and although various gabion assemblies are known in the art, there is still a need in the art for new and improved multi-compartment gabion assemblies and systems for treating stormwater run-off and/or discharges. The present invention fulfills these needs and provides for further related advantages.

SUMMARY OF THE INVENTION

In brief, the present invention in an embodiment is directed a multi-compartment gabion assembly configured to treat stormwater. The novel multi-compartment gabion assembly comprises a plurality of adjacently positioned and integrally connected gabion cells, wherein the integrally connected gabion cells includes at least one regular gabion cell and at least one corner gabion cell. The at least one regular gabion cell is structurally different than the at least one corner gabion cell.

Each regular gabion cell comprises: (1) an outer gabion housing made of a rigid and malleable mesh material (such as, for example, a heavy gauge wire box), wherein the outer gabion housing defines four outer gabion housing walls and an outer gabion housing floor; (2) a first multi-piece filter bag for filtering suspended solids out of the stormwater, wherein the first multi-piece filter bag is positioned within the four outer gabion housing walls of the outer gabion housing, and wherein the first multi-piece filter bag defines a first filter bag floor made of a nonporous sheet material connected to four surrounding first filter bag walls, wherein the first filter bag walls are made of at least two different water permeable sheet materials; and (3) two or more water permeable partitions vertically positioned within the outer gabion housing, wherein the two or more partitions segment the outer gabion housing into a plurality of different regular gabion cell compartments, with each regular cell gabion compartment containing a selected filter media (such as, for example, peat moss, organic compost, activated carbon, sand, rock, and combinations thereof) that is different from the selected filter media of the other regular gabion cell compartments.

Each corner gabion cell comprises: (1) an outer corner gabion housing made of a rigid and malleable mesh material (such as, for example, a heavy gauge wire box), wherein the outer corner gabion housing defines four corner gabion housing walls and a corner gabion housing floor; (2) a second multi-piece filter bag for filtering suspended solids out of the stormwater, wherein the second multi-piece filter bag is positioned within the four corner gabion housing walls of the outer corner gabion housing, and wherein the second multi-piece filter bag defines a second filter bag floor made of a nonporous sheet material connected to four surrounding second filter bag walls, wherein the second filter bag walls are made of at least two different water permeable sheet materials; and (3) two or more water permeable and generally L-shaped partitions vertically positioned within the outer gabion corner housing, wherein the two or more generally L-shaped partitions segment the outer gabion corner housing into a plurality of different generally L-shaped corner gabion cell compartments, with each generally L-shaped corner gabion cell compartment containing a selected filter media (such as, for example, peat moss, organic compost, activated carbon, sand, rock, and combinations thereof) that is different from the selected filter media of the other generally L-shaped corner gabion cell compartments.

In other embodiments, the novel multi-compartment gabion assembly comprises a wire mesh gabion that has a filter bag conformally positioned within the gabion, wherein the filter bag is made from at least two different water permeable sheet materials.

These and other aspects of the present invention will become more evident upon reference to the following detailed description and attached drawings. It is to be understood, however, that various changes, alterations, and substitutions may be made to the specific embodiments disclosed herein without departing from their essential spirit and scope.

BRIEF DESCRIPTION OF THE DRAWINGS

The drawings are intended to be illustrative of certain preferred embodiments of the present invention. Like reference numerals have been used to designate like parts and features throughout the several views of the drawings.

DETAILED DESCRIPTION OF THE INVENTION

Figure 1:
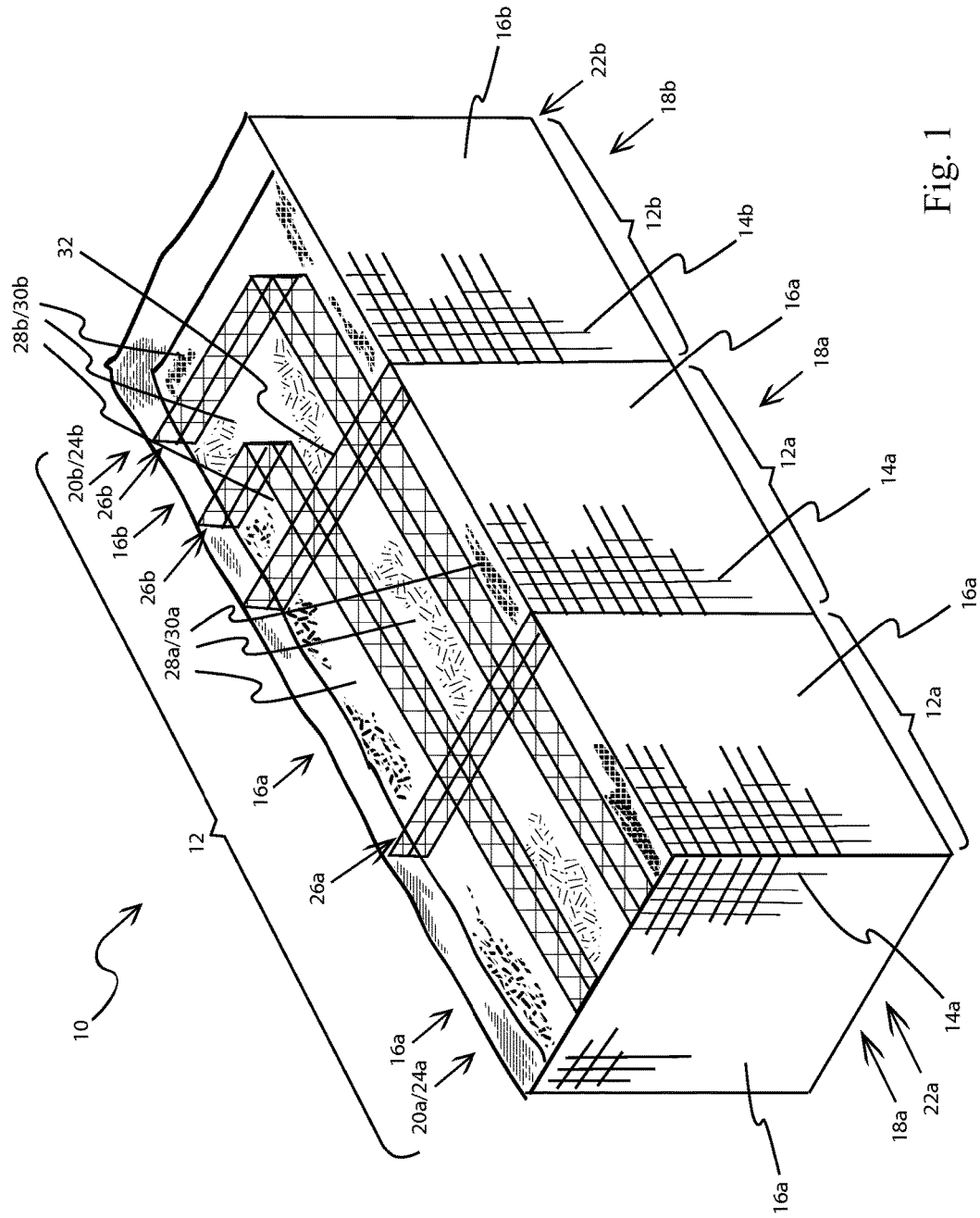
FIG. 1 is an elevated perspective view of a multi-compartment gabion assembly in accordance with an embodiment of the present invention.
Figure 2:
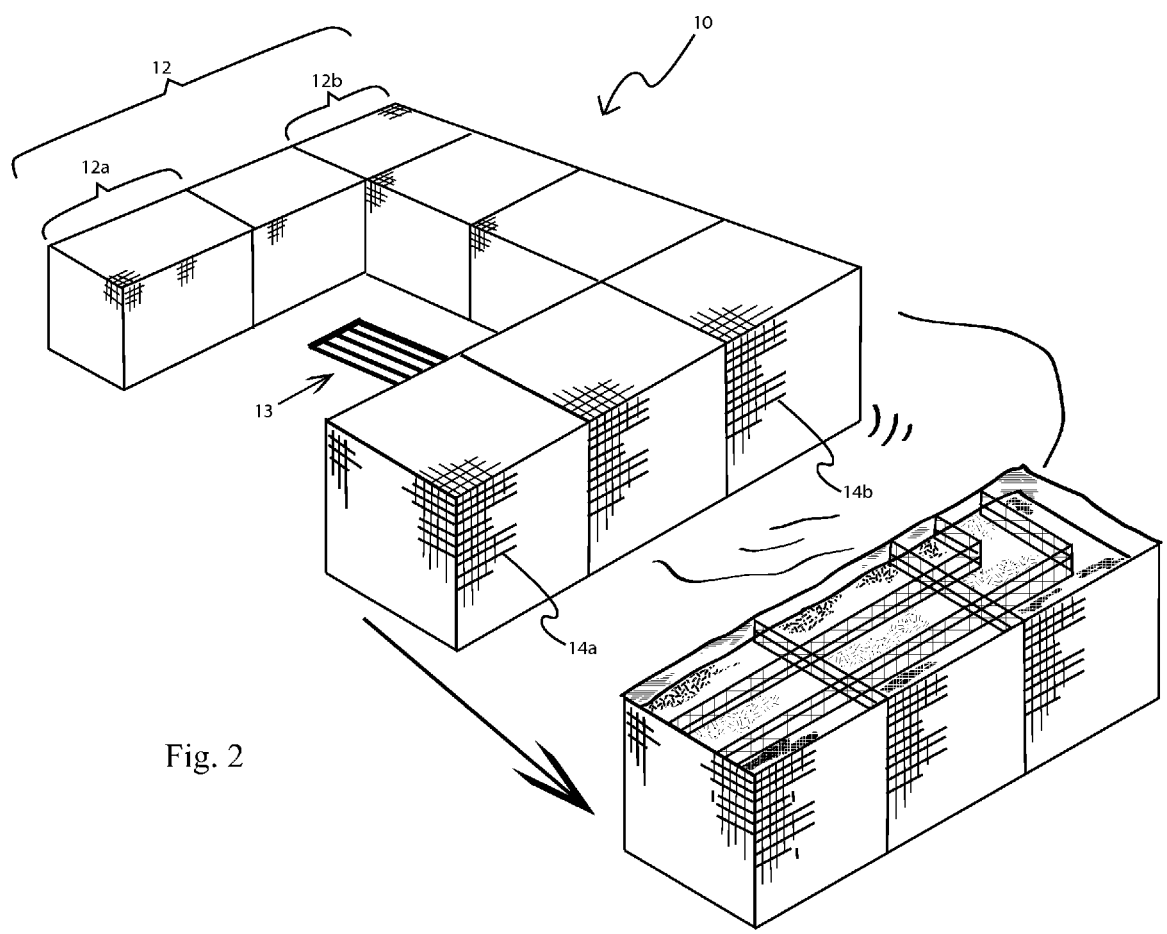
FIG. 2 is an elevated perspective view of a multi-compartment gabion assembly in accordance with an embodiment of the present invention, wherein the multi-compartment gabion assembly is shown partially surrounding a central floor drain (associated with a stormwater retention vault—not shown).

Referring now to FIGS. 1 and 2, the present invention in one embodiment is directed to a highly versatile multi-compartment gabion assembly 10 configured for treating stormwater run-off (not shown) commonly associated with various municipal, commercial, and industrial operations. As shown, the novel multi-compartment gabion assembly 10 comprises a plurality of adjacently positioned and integrally connected (and/or interconnectable) gabion cells 12 that includes at least one regular gabion cell 12a and at least one corner gabion cell 12b. Because the lego-style gabion cells 12 of the present invention may be constructed and fitted together modularly (so as to conform to a variety of irregular surfaces and spaces found in the field), the novel gabion cells 12 are particularly useful for treating and/or filtering stormwater retained within a stormwater retention vault having a central floor drain 13 (partially shown in FIG. 2). In addition, the modular design allows the multi-compartment gabion assembly 10 of the present invention to be tailored for specific municipal and industrial applications.

As best shown in FIG. 1, each regular gabion cell 12a of the present invention comprises an outer gabion housing 14a made of a rigid and malleable mesh material (such as, for example, a heavy gauge steel wire box that has optionally been plastic coated). As shown, the outer gabion housing 14a defines four walls 16a and a floor 18a. Similarly, each corner gabion cell 12b comprises an outer gabion housing 14b made of a rigid and malleable mesh material (such as, for example, a heavy gauge steel wire box), and the outer gabion housing 14b likewise defines four walls 16b and a floor 18b. Because the mesh material is rigid yet malleable, it can be bent to better conform to uneven surfaces and to specific geometries of the stormwater discharge site.

As shown, a first multi-piece filter bag 20a (for filtering suspended solids out of the stormwater—not shown) is positioned within the four walls 16a of the outer gabion housing 14a. In some embodiments, the first multi-piece filter bag 20a is made of an industrial filter cloth with medium-to-high porosity and high tensile and rip strengths. In other embodiments, the first filter bag 20a defines a first floor 22a made of a nonporous sheet material connected (generally by sewing or stitching) to four surrounding first filter bag walls 24a made of at least two different water permeable sheet materials (such as, for example, fabric sheets having different porosities and/or other filtering characteristics). Similarly, a second filter bag 20b for filtering suspended solids out of the stormwater (not shown) is likewise positioned within the four walls 16b of the corner gabion housing 14b. The second filter bag 20b defines a second floor 22b made of a nonporous sheet material connected to four surrounding second filter bag walls 24b made of at least two different water permeable sheet materials (such as, for example, fabric sheets having different porosities and/or other filtering characteristics). In this configuration, the different water permeable sheet materials will tend to strip out debris and suspended solids from a stormwater flowstream, thereby preventing those solids from fouling the filter media.

As still further shown, two or more water permeable partitions 26a are vertically positioned within the outer gabion housing 14a. The two or more partitions 26a divide the outer gabion housing 14a into a plurality of different compartments 28a, with each compartment 28a containing a selected filter media 30a that is different from the selected filter media 30a of the other compartments 28a. Similarly, two or more water permeable and generally L-shaped partitions 26b are vertically positioned within the outer gabion corner housing 14b. The two or more generally L-shaped partitions 26b divide the outer gabion corner housing 14b into a plurality of different generally L-shaped corner compartments 28b, with each generally L-shaped corner compartment 28b containing a selected filter media 30b that is different from the selected filter media 30b of the other generally L-shaped corner compartments 28b.

In some embodiments, one of the four walls 16a of the regular gabion housing 14a and one of the four walls 16b of the corner gabion cell 14b are the same and define a vertically positioned divider 32. In still further embodiments, a filter screen 34 is positioned adjacent to each of the two or more water permeable partitions 26a of each outer gabion housing 14a of each regular gabion cell 12a, and a generally L-shaped filter screen 36 is positioned adjacent to each of the two or more water permeable and generally L-shaped partitions 26b of each outer corner gabion housing 14b of each corner gabion cell 12b. This further configuration provides additional structural integrity, but can also assist with directing the flow of stormwater through the multi-compartment gabion assembly 10.

The selected media filter 30a, 30b preferably includes, but is not limited to, peat moss, organic compost, activated carbon, sand, rock, and various combinations thereof. Because of the large number of possible combinations of filtering media, and because the size of each different compartments 28a and generally L-shaped corner compartments 28b may selected prior to assembly, the multi-compartment gabion assembly 10 of the present invention can be specifically tailored to achieve many different stormwater discharge objectives.

The water permeable fabric associated with the first and second filter bag walls 24a, 24b may be, for example, an industrial filter fabric and/or a geotextile material.

Depending on site conditions, the regular gabion cells 12a may have cubic or non-cubic dimensions and the corner gabion cells 12b may likewise have cubic or non-cubic dimensions.

While the present invention has been described in the context of the embodiments illustrated and described herein, the invention may be embodied in other specific ways or in other specific forms without departing from its spirit or essential characteristics. Therefore, the described embodiments are to be considered in all respects as illustrative and not restrictive. The scope of the invention is, therefore, indicated by the appended claims rather than by the foregoing description, and all changes that come within the meaning and range of equivalency of the claims are to be embraced within their scope.

What is claimed is:

1. A multi-compartment gabion assembly configured to treat stormwater, comprising:
   a plurality of adjacently positioned and integrally connected gabion cells, including at least one regular gabion cell and at least one corner gabion cell;
   characterized in that each regular gabion cell comprises:
   an outer gabion housing made of a rigid and malleable mesh material, the outer gabion housing defining four outer gabion housing walls and an outer gabion housing floor;
   further characterized in that each regular gabion cell includes:
   a first filter bag for filtering suspended solids out of the stormwater, wherein the first filter bag is positioned within the four outer gabion housing walls of the outer gabion housing and adjacent to the four outer gabion housing walls, and wherein the first filter bag defines a first filter bag floor made of a nonporous sheet material connected to four surrounding first filter bag walls, wherein the first filter bag walls are made of at least two different water permeable sheet materials; and two or more water permeable partitions vertically positioned within the outer gabion housing, wherein the two or more partitions segment the outer gabion housing into a plurality of different regular gabion cell compartments, with each regular cell gabion compartment containing a selected filter media that is different from the selected filter media of the other regular gabion cell compartments;

further characterized in that each corner gabion cell comprises:

an outer corner gabion housing made of a rigid and malleable mesh material, the outer corner gabion housing defining four corner gabion housing walls and a corner gabion housing floor;

a second filter bag for filtering suspended solids out of the stormwater, wherein the second filter bag is positioned within the four corner gabion housing walls of the outer corner gabion housing and adjacent to the four corner gabion housing walls, and wherein the second filter bag defines a second filter bag floor made of a nonporous sheet material connected to four surrounding second filter bag walls, wherein the second filter bag walls are made of at least two different water permeable sheet materials; and two or more water permeable and generally L-shaped partitions vertically positioned within the outer gabion corner housing, wherein the two or more generally L-shaped partitions segment the outer gabion corner housing into a plurality of different generally L-shaped corner gabion cell compartments, with each generally L-shaped corner gabion cell compartment containing a selected filter media that is different from the selected filter media of the other generally L-shaped corner gabion cell compartments.

2. The multi-compartment gabion assembly according to claim 1 wherein each of the two or more water permeable partitions vertically positioned within the outer gabion housing of the at least one regular gabion cell is made of a rigid and malleable wire mesh.

3. The multi-compartment gabion assembly according to claim 1 wherein each of the two or more water permeable and generally L-shaped partitions vertically positioned within the outer gabion corner housing of the at least one corner gabion cell is made of a rigid and malleable wire mesh.

4. The multi-compartment gabion assembly according to claim 1 wherein the selected media filter includes peat moss, organic compost, activated carbon, sand, rock, and combinations thereof.

5. The multi-compartment gabion assembly according to claim 4 wherein the at least two different water permeable sheet materials are each an industrial filter cloth material.

6. The multi-compartment gabion assembly according to claim 5 wherein the rigid and malleable mesh is a made of wire that is plastic coated.

7. The multi-compartment gabion assembly according to claim 6 wherein the at least one regular gabion cell has cubic dimensions.

8. The multi-compartment gabion assembly according to claim 7 wherein the at least one corner gabion cell has cubic dimensions.

* * * * *